United States Patent
Kumar et al.

(10) Patent No.: US 11,994,932 B2
(45) Date of Patent: May 28, 2024

(54) PLATFORM AMBIENT DATA MANAGEMENT SCHEMES FOR TIERED ARCHITECTURES

(71) Applicant: Intel Corporation, Santa Clara, CA (US)

(72) Inventors: Karthik Kumar, Chandler, AZ (US); Thomas Willhalm, Sandhausen (DE); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 16/907,264

(22) Filed: Jun. 21, 2020

(65) Prior Publication Data
US 2020/0319696 A1     Oct. 8, 2020

(51) Int. Cl.
*G06F 1/32* (2019.01)
*G06F 1/3234* (2019.01)
*G06F 1/3287* (2019.01)

(52) U.S. Cl.
CPC .......... *G06F 1/3275* (2013.01); *G06F 1/3287* (2013.01)

(58) Field of Classification Search
CPC .............................. G06F 1/3275; G06F 1/3287
See application file for complete search history.

(56) References Cited

U.S. PATENT DOCUMENTS

| | | | |
|---|---|---|---|
| 2013/0268741 A1* | 10/2013 | Daly ................... | G06F 11/3471 711/E12.002 |
| 2017/0188308 A1* | 6/2017 | Nolan ................... | H04L 43/106 |
| 2019/0018712 A1* | 1/2019 | Foxworth ............. | G06F 3/0646 |

OTHER PUBLICATIONS

Interleaved memory, Wikipedia, retrieved from the Internet at <https://web.archive.org/web/20180102202246/https://en.wikipedia.org/wiki/Interleaved_memory>, 2 pages (Year: 2018).*

* cited by examiner

*Primary Examiner* — Stefan Stoynov
(74) *Attorney, Agent, or Firm* — Compass IP Law PC

(57) ABSTRACT

Methods and apparatus for platform ambient data management schemes for tiered architectures. A platform including one or more CPUs coupled to multiple tiers of memory comprising various types of DIMMs (e.g., DRAM, hybrid, DCPMM) is powered by a battery subsystem receiving input energy harvested from one or more green energy sources. Energy threshold conditions are detected, and associated memory reconfiguration is performed. The memory reconfiguration may include but is not limited to copying data between DIMMs (or memory ranks on the DIMMS in the same tier, copying data between a first type of memory to a second type of memory on a hybrid DIMM, and flushing dirty lines in a DIMM in a first memory tier being used as a cache for a second memory tier. Following data copy and flushing operations, the DIMMs and/or their memory devices are powered down and/or deactivated. In one aspect, machine learning models trained on historical data are employed to project harvested energy levels that are used in detecting energy threshold conditions.

23 Claims, 13 Drawing Sheets

PLATFORM AMBIENT DATA MANAGEMENT SCHEMES FOR TIERED ARCHITECTURES

BACKGROUND INFORMATION

Power and latency are both first class constraints in edge data centers, and the memory subsystem is significantly responsible both for power consumption and for meeting low latency requests. Further, with no single memory technology being able to meet capacity needs as well latency, and bandwidth requirements for the memory subsystem, current direction trends to having a heavily tiered memory subsystem, with some of the tiers including Dynamic Random Access Memory (DRAM), DC Persistent Memory Module (DCPMM), and other emerging storage/memory technologies, including Remote Direct Memory Access (RDMA) access to a remote tier of memory. With edge compute resources often being powered by ambient power sources, including solar/wind power, with battery-based augmentation, it becomes critical to have the flexibility to find a power-optimized memory subsystem configuration for all deployment scenarios.

The edge is a heavily power-constrained environment, and therefore it is critical to be energy efficient. Populating a platform configuration that is not beneficial to the edge application is wasteful. Therefore, there comes the need to be able to dynamically configure and provision platform capabilities—to optimize for power in a flexible manner—based on application requirements. Unfortunately, current platform memory systems are rigid and inflexible, with a pre-determined configuration and address map that is determined at boot time and cannot be changed. Power needs to be expended for all of the memory subsystem, as even the interleave between memory DIMMs is fixed at boot-time and cannot be modified; thus, the only means to save power is to be able to have periods of inactivity that result in reactively having memory going to low power modes such as self-refresh for DRAM.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
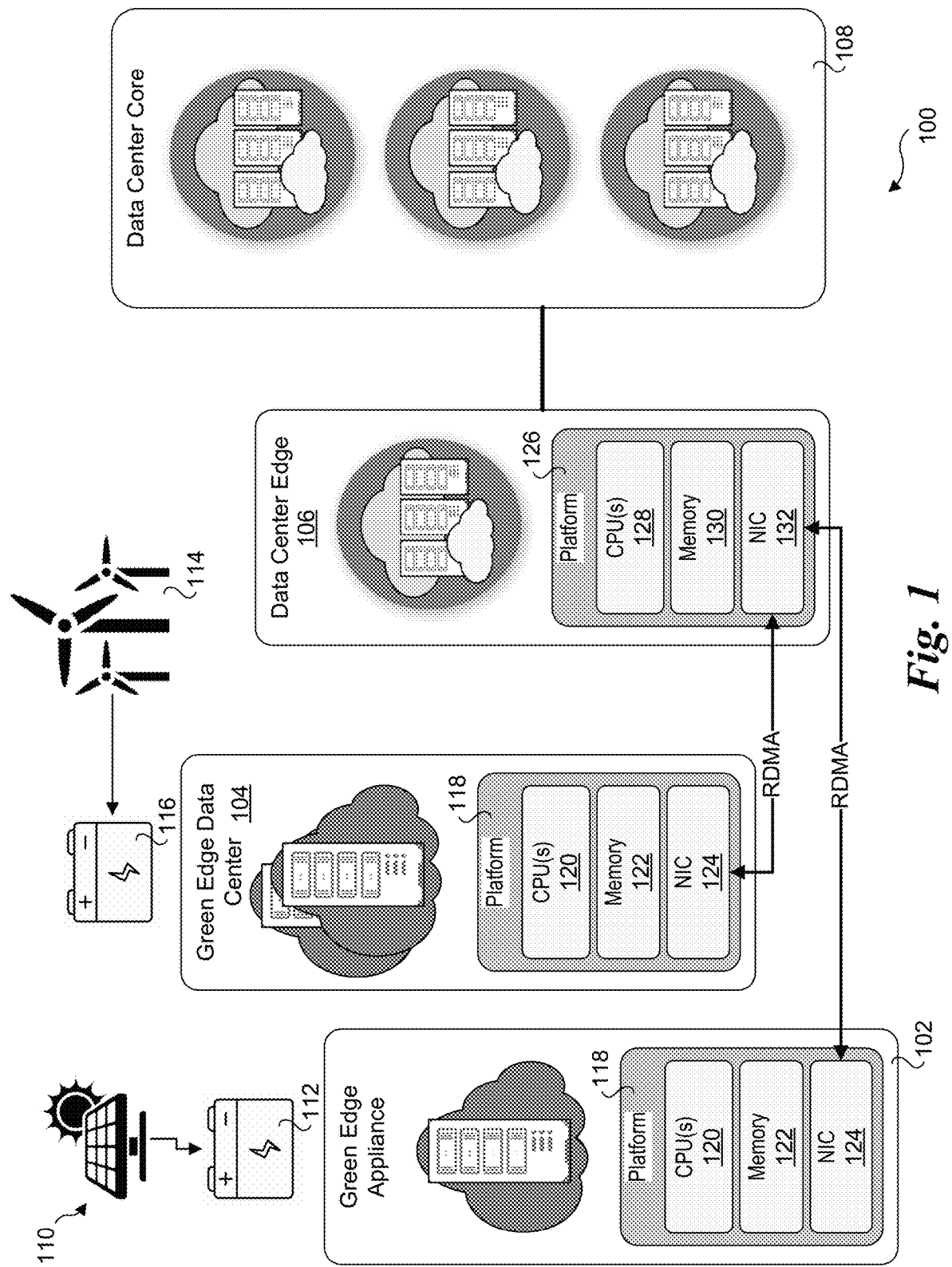
FIG. 1 is a schematic diagram of an exemplary distributed environment including a green edge appliance, a green edge data center, a data center edge, and a core data center.

Embodiments of methods and apparatus for platform ambient data management schemes for tiered architectures are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Adapting the platform for the edge calls for re-thinking of platform memory usage to be optimized for low power usages. This includes the following:

1) Decomposing the platform memory into fine grained modules/ranks that can be turned "on" or "off" dynamically to conserve power when needed. For example, 1 TB of platform DRAM (8×128 GB DIMMs) are decomposed into 100 modules of ~10 GB each, and these can be powered on or off independently. Likewise, similar techniques may be applied for DCPMM or other memory technologies
2) An implicit assumption that comes with turning "off" a module is following capabilities: (a) that the platform address map is reconfigured dynamically on the fly, and (b) platform engines/accelerators can be leveraged to copy data as needed between the modules.
3) Capabilities to do so for new types of hybrid memory DIMMs that can have multiple memory technologies on the same DIMM: for example, memory DIMMs that have both DRAM and DPCMM on them, each of which is further decomposable into power-on-off capable smaller modules.
4) Platform logic to determine application requirements, based on reactive or pre-specified usages, and use these to determine how many modules of each memory type are needed on a flexible, fine grained basis with the objective to optimize power consumption while meeting latency requirements.

In accordance with aspects of the embodiments disclosed herein, the foregoing and other needs are met through a solution that expand current platform architecture to make memory tiers and memory configuration aware on current and coming power availability on a green based edge appliance. Embodiments of platform architectures include a novel logic and components that are responsible for deciding what memory tiers should be active or not active depending on the current and projected power availability in the system and how each of the services in the system are performing. Using well-known key performance indicators, this logic is capable of identifying whether a particular memory tier can be shut down without substantially affecting the level of performance of the different services (the more critical the situation it is the more degradation is accepted). In some embodiments the platform utilizes accelerators (such as Data Streaming Accelerator (DSA)) to perform data movement between tiers (e.g., between a tier being powered down and a next tier in the tiered memory architecture). DIMMs or channels for the tier from which data are copied may be powered down and/or deactivated. In accordance with another aspect, under certain power conditions, a Network Interface Controller (NIC) will operate as an additional level of memory and expose access to remote memory via RDMA (Remote Direct Memory Access) transparently to the application. In one embodiment, specific virtual lanes are used to transfer traffic to the next level of data center using RDMA.

In some embodiments the memory tiers in the edge platform are populated with hybrid DIMMS. Each of these DIMMS host two or more type of memory technologies with different memory properties. Each of these memory technologies can be active at the same time or not (acting as memory tiers). Under an aspect of the hybrid DIMM power management, data is copied a first portion of memory employing one technology to a second portion of memory employing another technology. The system address decoders of the platform are then reprogrammed to point to the new physical location of the data, and the first portion of memory may be powered done. Under another aspect under which memory using a first technology (e.g., DRAM) is operated as a cache for memory using a second technology (e.g., non-volatile memory (NVM)), dirty lines of data are flushed from the cache to update the NVM, and the memory used as a cache is shutdown.

FIG. 1 shows an exemplary distributed environment 100 including a green edge appliance 102, a green edge data center 104, a data center edge 106, and a core data center 108. The terms "edge appliance" and "edge data center" are broadly construed as a facility or structure housing one or more platforms, such as servers, that is remotely located from one or more data center edges and/or core data centers. Non-limiting examples of edge appliance and edge data center deployments include a cabinet located at a street corner or near other utility equipment (generally referred to as a "street cabinet" whether or not it is located on a street), cabinets at macro- or micro-cell sites, and structures in proximity to remote industrial facilities (e.g., pipeline pump station or distribution point). The "data center" aspect merely means processing of data is being performed by one or more platforms. Smaller edge deployments, such as one or a few platforms, are generally referred to as edge appliances, although edge data centers and edge appliances may be used interchangeably herein.

The "green" adjective generally means the edge data center or appliance is primarily powered by a green energy source such as solar and/or wind power. Such energy sources provide intermittent power that is a function of local ambient conditions (e.g., solar exposure, wind velocity). To provide continuous or semi-continuous power, electrical energy output from a green energy source is input to a battery subsystem comprising one or more batteries, as well as applicable power conditioning equipment. A characteristic of a green edge data center or green edge appliance is that there is insufficient available continuous energy to operate the one or more platforms at a full performance level in an ongoing manner. Accordingly, the embodiments disclosed herein provide means for dynamically managing the power consumption of the green edge appliances and green edge data centers in consideration of currently available power, projected available power, and current and/or projected power consumption.

As shown in FIG. 1, green edge appliance 102 is powered by one or more solar panels 110 coupled to a battery subsystem comprising one or more batteries 112. The green energy source for green edge data center 104 comprises one or more wind turbines 114 coupled to a battery subsystem comprising one or more batteries 116. In some deployments, a green energy source may be backed-up by a generator or the like, which may be automatically started under emergency conditions; however, such a back up power source generally may or may not be available.

Green edge appliance 102 includes one or more platforms 118, each comprising one or more CPUs 120, memory 122, and a Network Interface Controller or Card (MC) 124. Similarly, green edge data center 104 includes one or more platforms 118 comprising one or more CPUs 120, memory 122, and a NIC 124. Under the embodiments herein, at least one platform in a green edge appliance or green edge data center is an adaptive platform configured to adapt its configuration and power consumption levels. In some embodiments, all the platforms are adaptive platforms. In other embodiments, a mix of adaptive and non-adaptive platforms may also be deployed.

Data center edge 106 is illustrative of a facility that provides communication between edge appliances and edge data centers and core facilities in data center (aka a data center core). Generally, a data center edge may be co-located with a data center core or it may be deployed at a separate location from a data center core. A data center edge includes a plurality of platforms installed in one or more racks or cabinets. Various platform and rack/cabinet architecture may be used, including but not limited to blade servers, server modules, 1 U, 2 U, and 4 U servers, including single- and multi-socket servers. For illustrative purposes and simplicity, a platform 126 is depicted including one or more CPUs 128, memory 130, and a NIC 132.

Figure 2:
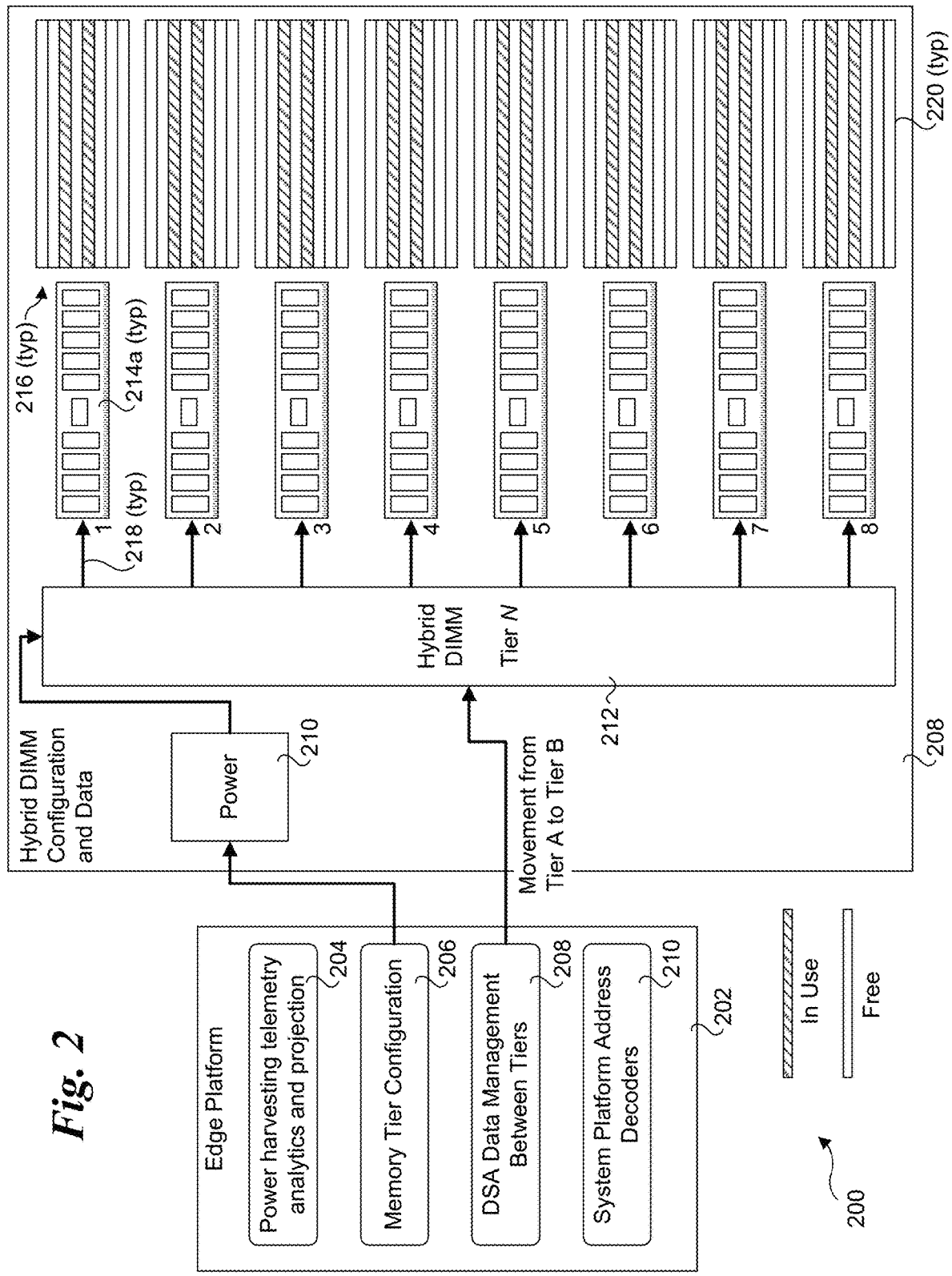
FIG. 2 is a schematic diagram of an edge platform architecture, according to one embodiment, focusing on memory configuration aspects.

FIG. 2 shows an edge platform architecture 200, according to one embodiment. Edge platform architecture 200 includes an edge platform configured to implement multiple functional blocks including a power harvesting telemetry analytics and project block 204, a memory tier configuration block 206, a Data Streaming Accelerator (DSA) data management between tiers block 208 and system platform address decoders 208. Hybrid DIMM configuration and data 208 depicts aspects of memory utilization for edge platform 202. This includes a power block 210, a hybrid DIMM tier 212 (Tier N), 8 hybrid DIMMs 214a (numbered 1-8) and associated physical address spaces 216. The use of 8 hybrid DIMMs 214a is merely exemplary, as other combination of hybrid DIMMs and non-hybrid DIMMs may be operated in a similar manner. For example, 4, 6, 8, 10, 12, 16 etc. DIMMs may be used. Each hybrid DIMM 214a is provided with a power input 218 that can be separately turned on or off.

In some embodiments, a striping and/or interleaving scheme is implemented to store data in memory address spaces 216, as illustrated in FIG. 2. Under the striping/interleaving scheme, data is stored in an aggregated memory address space (the combined physical address spaces 216 of the hybrid DIMMs) in a distributed manner to maximize available bandwidth by (preferably) spreading data across all (or most) hybrid DIMMs. This (generally) will result in improving performance by utilizing more memory channels to increase bandwidth and since the data is more distributed the average access latency may be reduced. However, this comes at a cost of higher power consumption.

When it is desired or required to reduce power consumption, data is migrated between hybrid DIMMs by copying the data. Under one embodiment, power management and usage of each hybrid DIMM 214a is managed at the (whole) device level. Thus, a hybrid DIMM 214a that is currently used to store data is turned on, while hybrid DIMMs that are not currently storing any data may be turned off. Alternatively, as discussed above, in other embodiments the platform memory is decomposed into fine grained modules/ranks that can be turned on or off dynamically to conserve power, and thus individual modules or ranks may be selectively activated to store data and deactivated when data storage is no longer needed.

Figure 2A:
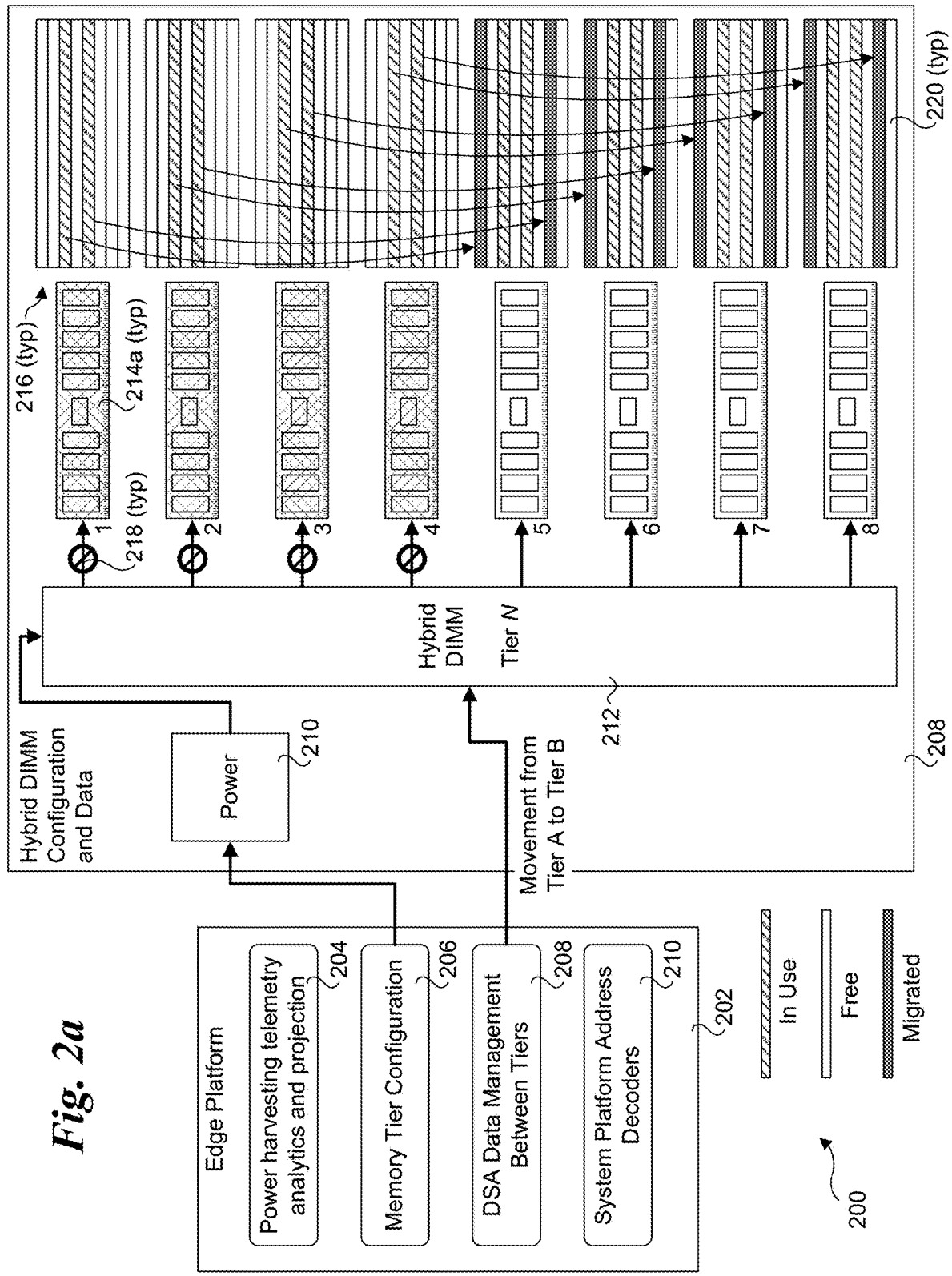
FIG. 2a shows an exemplary copying of memory from a first set of DIMMs to a second set of DIMMs, followed by shutting down the first set of DIMMS.

FIGS. 2 and 2a illustrate an example of power management and usage at the hybrid DIMM level. In this example the physical address space 216 of each hybrid DIMM 214a is logically (and/or physically) partitioned into 8 blocks 220. For simplicity, in FIG. 2 each of the third and fifth block are depicted as in use (and thus containing data); in practice different blocks 220 of data may be active for different hybrid DIMMs. In FIG. 2a, power to each of hybrid DIMMs 1-4 is turned off or otherwise reduced to a low-power state. Prior to this, the data in hybrid DIMMs 1-4 is copied to unused blocks in hybrid DIMMs 5-8, as shown in FIG. 2a.

Figure 3A:
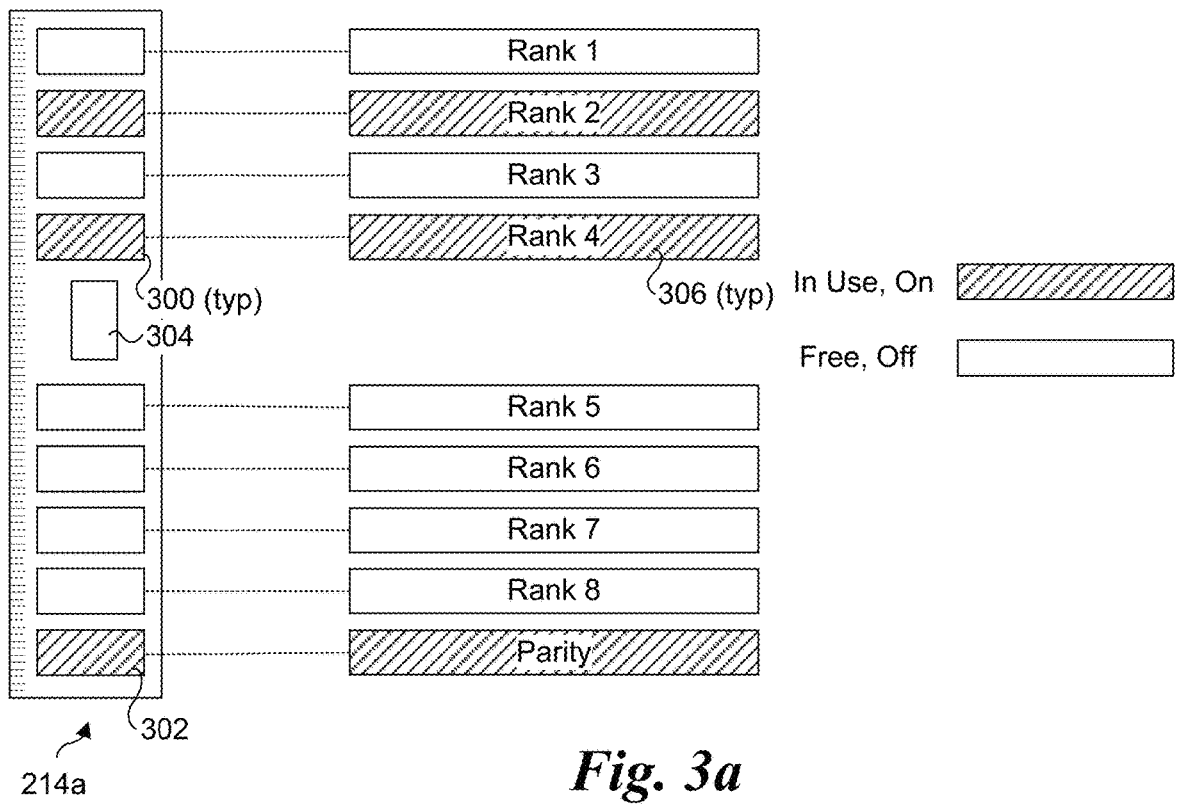
FIG. 3a is a diagram illustrating a memory rank-based storage scheme for a DIMM employing parity.
Figure 3B:
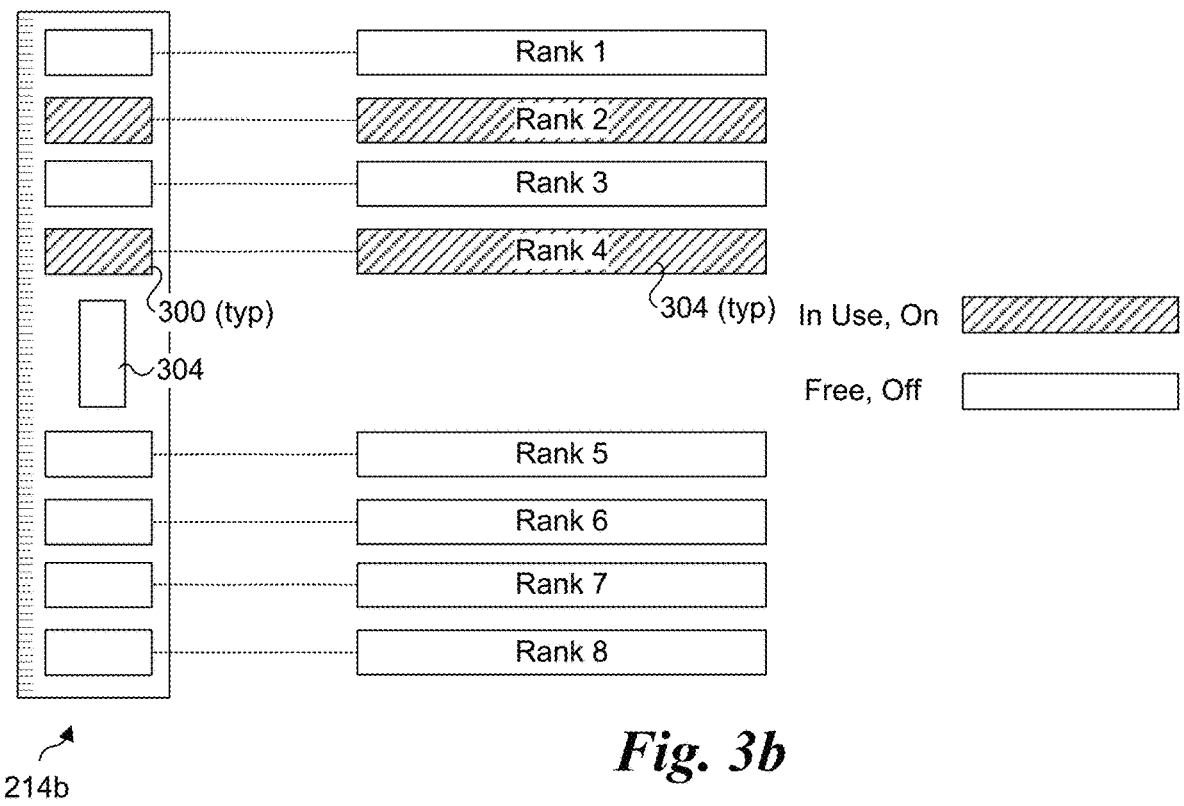
FIG. 3b is a diagram illustrating a memory rank-based storage scheme for a DIMM that does not employ parity.

FIGS. 3a and 3b show examples of embodiments that manage power at the block (e.g., rank) storage level. FIG. 3a shows a hybrid DIMM 214a supporting parity. On the side of the DIMM shown, there are nine memory chips 300, eight of which are used for storing data and one of which is used for storing parity information, as depicted by memory chip 302. DIMM 214a further includes a control chip 304 that is illustrative of one or more control chips or the like that may be present on a hybrid DIMM. Each memory chip 300 is used for storing data in a respective rank 304, as depicted by Rank 1, Rank 2, . . . Rank 8. These ranks correspond to blocks 220 in FIGS. 2, 2a, 4 and 4a (below). Each memory chip 300 can be selectively turned on and off or otherwise put in an active state and a lower-power non-active or standby state. In one embodiment, parity chip 302 is activated when one or more memory chips 300 are active. FIG. 3b shows a hybrid DIMM 214b without parity support. It includes the same components as hybrid DIMM 214a except for parity chip 302.

A hybrid DIMM may have a first type of memory chip on one side and a second type of memory chip on the other side, or may have both types of memory chips on both sides. For example, the first type of memory chip may be a DRAM chip and the second type of memory chip may be an NV (non-volatile) memory (NVM) chip. For illustrative purposes and simplicity, only a single side of a hybrid DIMM is shown in the Figures herein.

Figure 4:
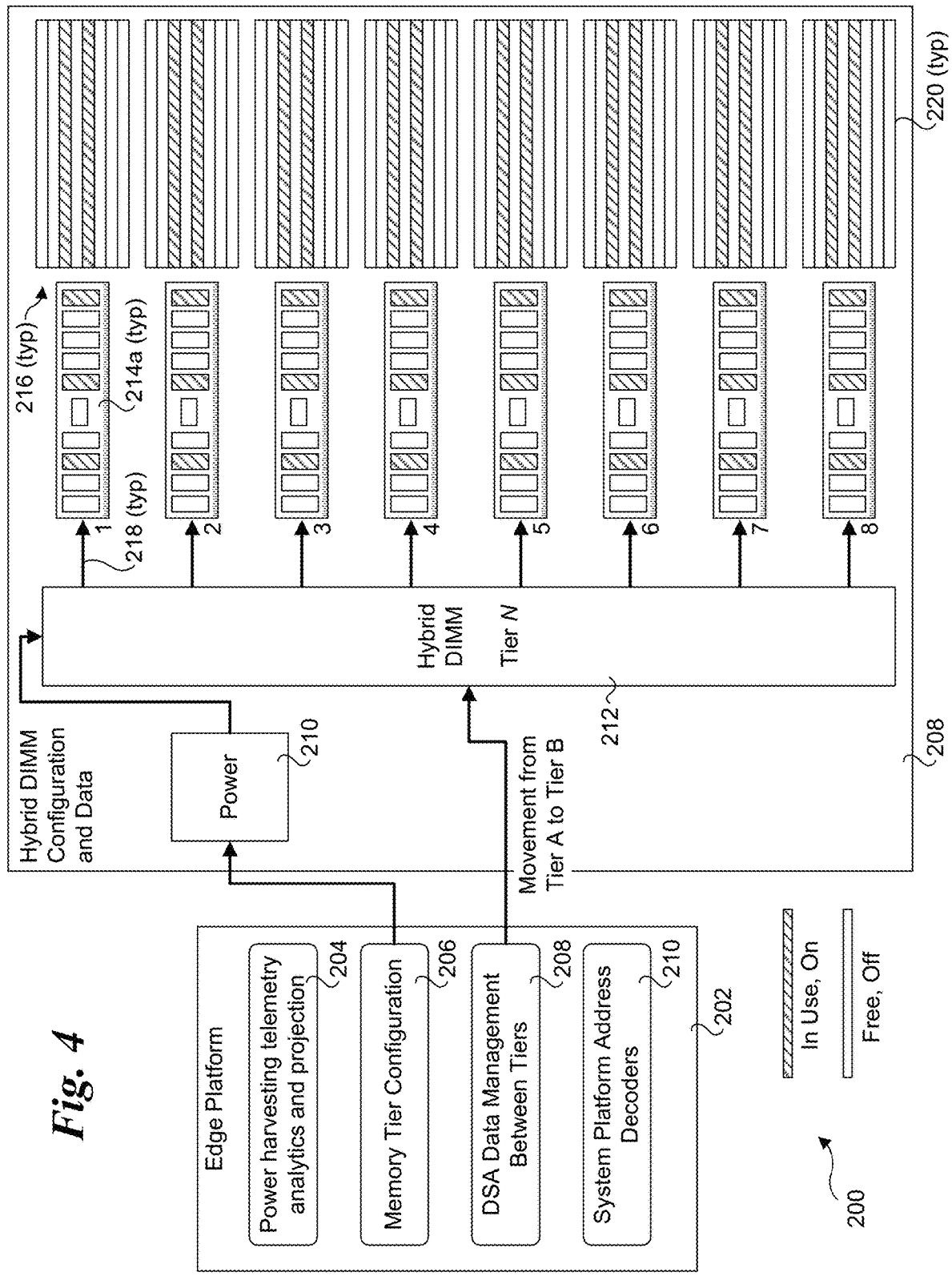
FIG. 4 is a schematic diagram of an edge platform architecture corresponding to an augmented version of the edge platform architecture in FIG. 2 employing a memory rank-based storage scheme, according to one embodiment.
Figure 4A:
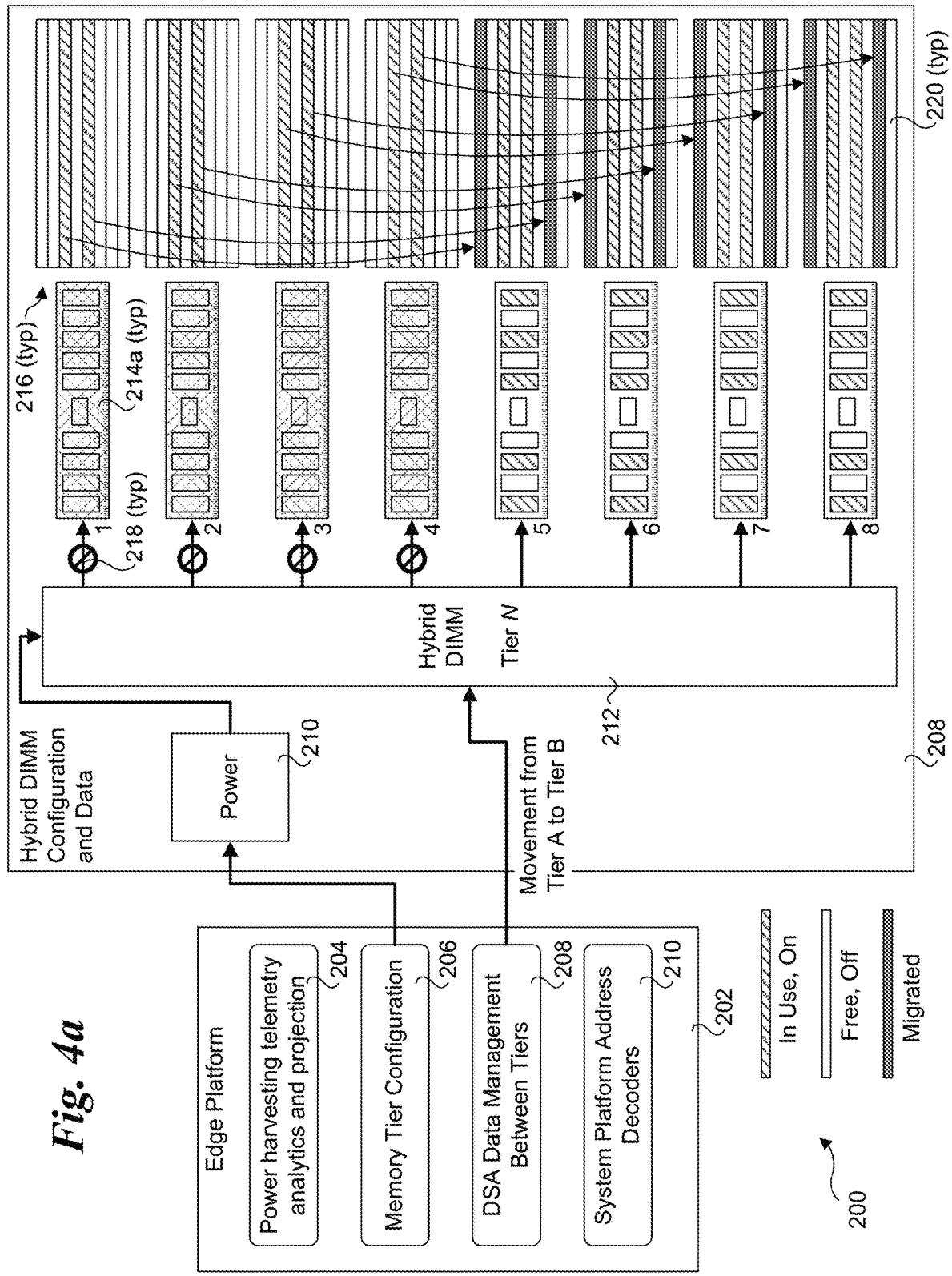
FIG. 4a shows an exemplary copying of memory from memory ranks in a first set of DIMMs to open memory ranks in a second set of DIMMs, followed by shutting down the first set of DIMMS.

FIGS. 4 and 4a illustrate a block (rank)-level power management scheme before and after migration. Under the configuration shown in FIG. 4, each of the third and fifth memory chip is powered, along with the parity chip (ninth chip). During migration, data in Rank 3 and Rank 5 of each of hybrid DIMMs 1-4 is respectively copied to Rank 1 and Rank 7 of hybrid DIMMs 5-8. Following migration, each of hybrid DIMMs 1-4 is turned off or put in a low-power standby state.

Under the block/rank/memory device power management scheme, the migration results in a reduction in total power consumed across hybrid DIMMs 214a. While the power consumption of hybrid DIMMs 5-8 has slightly increased (via activation of Ranks 1 and Rank 7), this is more than offset by turning each of hybrid DIMMs 5-8 off or putting them in a low-power standby state.

Figure 5:
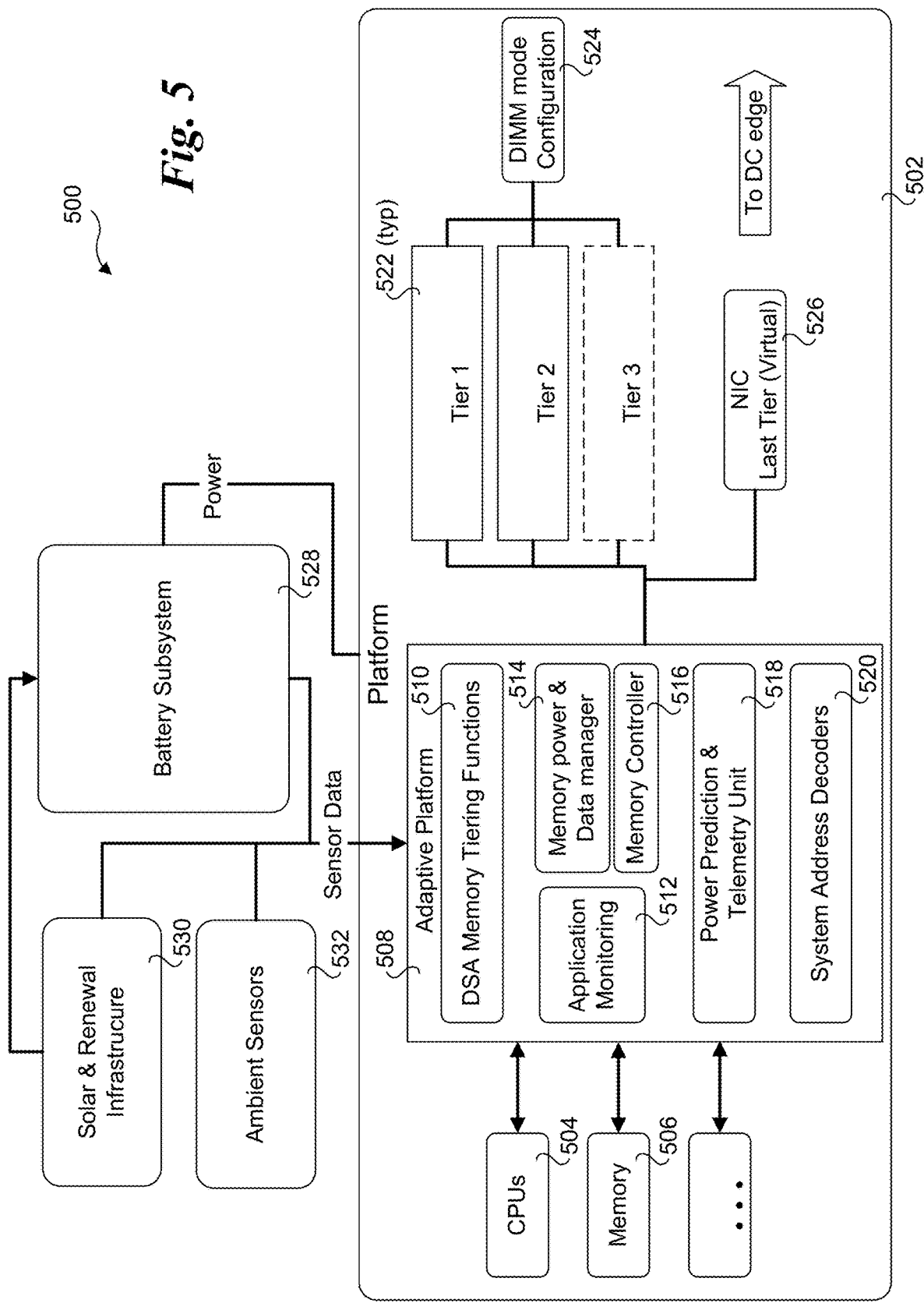
FIG. 5 is a schematic diagram illustrating further aspects of the power and memory management schemes depicted in FIGS. 2 and 4, according to one embodiment.

FIG. 5 shows an architecture 500 illustrating further aspects of the power and memory management schemes described above. Architecture 500 includes a platform 502 including one or more CPUs 504, memory 508 and an adaptive platform 508 having DSA memory tiering functions 510, application monitoring 512, a memory power and data management unit 514, a memory controller 516, power prediction and telemetry unit 518, and system address decoders 520. Platform 502 further includes a plurality of tiers of DIMMs 522 (three of which are shown, with Tier 3 being optional), a DIMM mode configuration block 524, and a NIC 526 configured to operate as a virtual last tier as described below. DIMMs 522 may comprise DRAM DIMMs, hybrid DIMMs and/or DCPMMs.

Power to platform 502 is provided by a battery subsystem 528 that is connected to a green power source (as represented by solar and renewal infrastructure 530) such as one or more solar panels, a power feed from a wind turbine or wind farm, or a combination of green energy sources. Adaptive platform 508 receives sensor data from solar and renewal infrastructure 530, ambient sensors 32 and battery subsystem 528.

Power prediction and telemetry unit 520 is responsible for processing energy harvesting and battery status information from the energy management system in order to:
1) Identify when the system is in a given energy availability state or mode. In one embodiment, a granularity of low, medium or high critical energy availability states are implemented, noting the ranges or states of criticality can be even more fine grain. Each state will have an associated operational mode that will have an associated amount of time that the platform or system can survive (while operating in that mode) before dying due to lack of energy.
2) Predict how the system will evolve over the next units of time and hence predict when it is expected that state of the energy availability may change in the coming future.
3) Provide notification to the memory power & data management unit that a particular operating mode has been entered.

Platform 502 employs a power management architecture that is responsible for deciding whether a particular memory tier, channel, DIMM or part of the DIMM is to be powered down. In one embodiment, the power management unit is part of the memory power & data management unit, and is configured to account for how much power is consumed by each of the tiers of the memory, DIMMS and subcomponents of the DIMM is consuming. For one or more applications running on the platform, the power management unit will estimate how much memory bound the application has (e.g., latency and/or bandwidth bound). For example, this enables the power management unit to identify how much impact it would have on the application to shut down the closest memory tier.

The power management unit will also determine if the system is entering a critical energy mode. In response to such a determination, the power management unit may:
1) Start shutting down memory channels within a memory tier. If some applications are memory bound and still taking benefit of the current tier:
   a) The applications which are not memory bound their memory pages will be updated to target an address space which is being cached for the next memory tiers.
   b) The data will be flushed (copied) from the current channel DIMMs to the next level of tier. This will be performed by a DSA engine as part of DSA memory tiering functions 510.

A similar migration process may be performed with the media of hybrid DIMMs (e.g., copy from utilizing NV memory+DRAM memory to only using NV memory).

When the level of criticality reaches a certain threshold (e.g., energy is below 50%), the logic may decide to shut down an entire memory tier. In this case, when a current memory tier is being used as an inclusive cache for a next memory tier:
1) Memory will be flushed (only dirty lines) to the next level (Tier) of memory.
2) Memory is shut down.
3) No changes in the memory system address decoder will happen.

Another aspect of architecture 500 is using the NIC as a last level of memory. In practice, the memory is remotely located at a next level of edge (e.g., a data center edge, such as a central office edge), with the NIC using RDMA transfers to read and write to the remote memory. Thus, this last (NIC) tier is a type of virtual memory tier since the memory is not located on the platform or in an appliance or system in which the platform is deployed. Under this scheme:

1) The data will be copied over to the next level of edge.
2) The system address decoder will be updated to redirect any memory access request to the NIC.
3) The NIC will act as memory controller using the remote edge as a memory pool using RDMA protocols.

Figure 6:
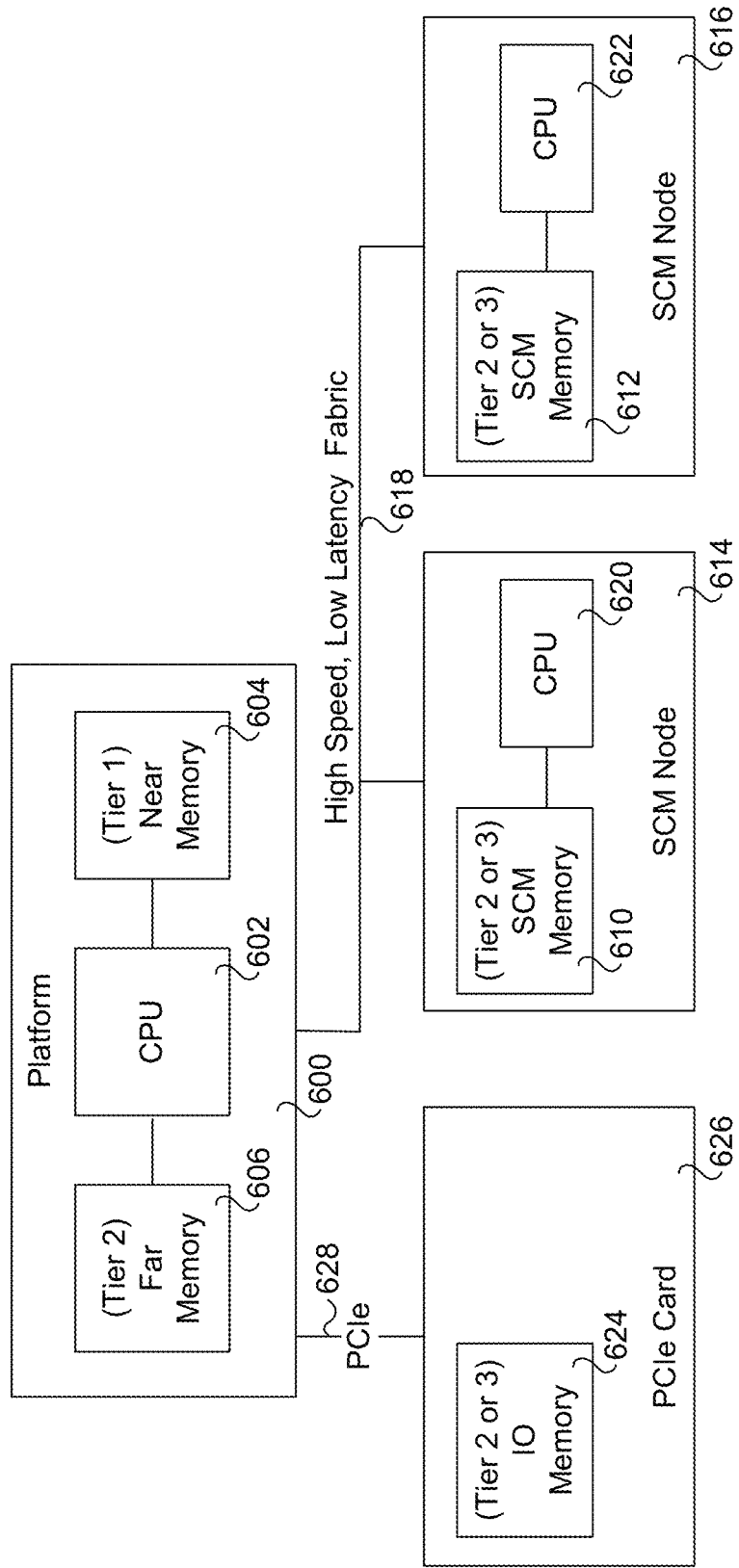
FIG. 6 is a schematic diagram illustrating an overview of a multi-tier memory scheme, according to one embodiment.

The teachings and the principles described herein may be implemented using various types of tiered memory schemes. For example, FIG. 6 illustrates an abstract view of a tiered memory scheme employing three tiers: 1) "near" memory; 2) "far" memory; and 3) SCM (storage class memory). The terminology "near" and "far" memory do not refer to the physical distance between a CPU and the associated memory device, but rather the latency and/or bandwidth for accessing data stored in the memory device.

FIG. 6 shows a platform 600 including a central processing unit (CPU) 602 coupled to near memory 604 and far memory 606. Compute node 600 is further connected to SCM memory 610 and 612 in SCM memory nodes 614 and 616 which are coupled to compute node 600 via a high speed, low latency fabric 618. In the illustrated embodiment, SCM memory 610 is coupled to a CPU 620 in SCM node 614 and SMC memory 612 is coupled to a CPU 622 in SCM node 616. FIG. 6 further shows a second or third tier of memory comprising IO (Input-Output) memory 624 implemented in a PCIe (Peripheral Component Interconnect Express) card 626 coupled to platform 600 via a PCIe link 628.

Figure 7:
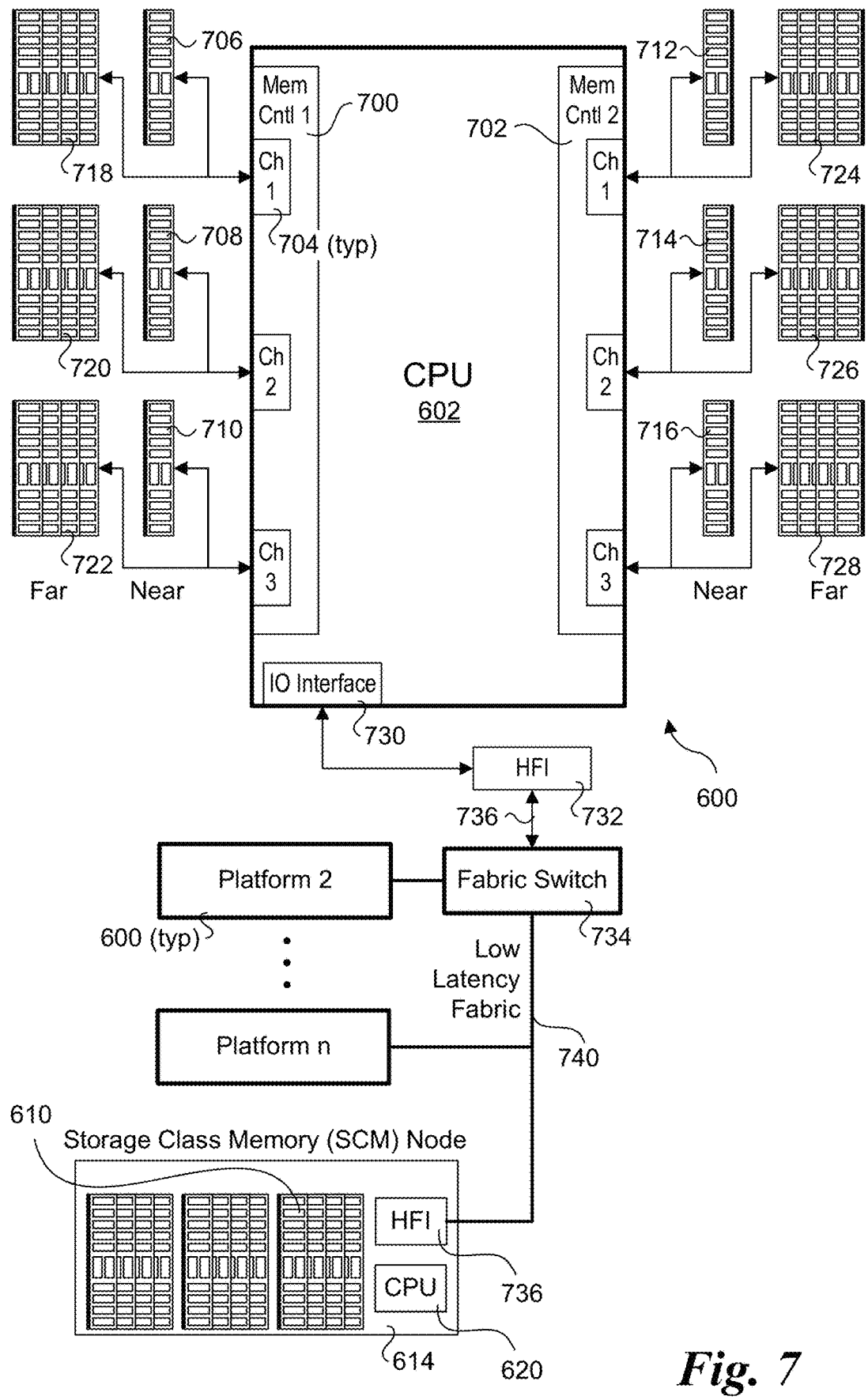
FIG. 7 is a diagram illustrating one embodiment of a multi-tier memory architecture under which near memory is accessed locally, and far memory includes both local memory devices and storage class memory (SCM) accessed over a low latency fabric.

FIG. 7 show further details of one embodiment of platform 600. CPU 602 includes a pair of memory controller 700 and 702, each including three memory channels 704 (also labeled Ch(annel) 1, Ch 2, and Ch 3). Each of the memory channels 704 is coupled to a respective pair of memory devices, including a near memory device (memory devices 706, 708, 710, 712, 714, and 716) and a far memory device (memory devices 718, 720, 722, 724, 726, and 728). CPU 602 further includes one or more input-output (TO) interfaces 730.

In the illustrated embodiment, IO interface 730 of CPU 602 is coupled to a host fabric interface) HFI 732, which in turn is connected to fabric switch 734 via a fabric link 736. An HFI 738 on an SCM node 738 is coupled to low latency fabric 740, as are one or more other platforms 600. In one embodiment, SCM memory 610 supports the NVMe (Non-volatile Memory express) protocol and is implemented using an NVMe over Fabric (NVMe-oF) protocol. Far SCM memory 610 may also be implemented using other types of non-volatile memory devices and protocols, such as DCPMM devices and protocols.

In some embodiments near memory operates as a cache for far memory. The cache may be inclusive or non-inclusive. For an inclusive cache, since most of the data are already cached in far memory only dirty lines need to be flushed to far memory prior to shutting down a near memory DIMM used as a cache. For a non-inclusive cache architecture, data in a near memory DIMM will be copied to far memory before the DIMM is shut down.

Depending on the platform architecture, memory controller channels may also be shutdown. For example, for embodiments under which a first tier of memory employs memory controllers on a CPU and a second tier includes SCM and/or DCPMM memory access over a fabric or over PCIe, memory channels in a memory controller may be shut down in addition to shutting down memory devices (e.g., DIMMs coupled to those memory channels). When the same memory channels are used for near and far memory, such as shown in FIG. 7, the memory channels will remain operative.

Figure 8:
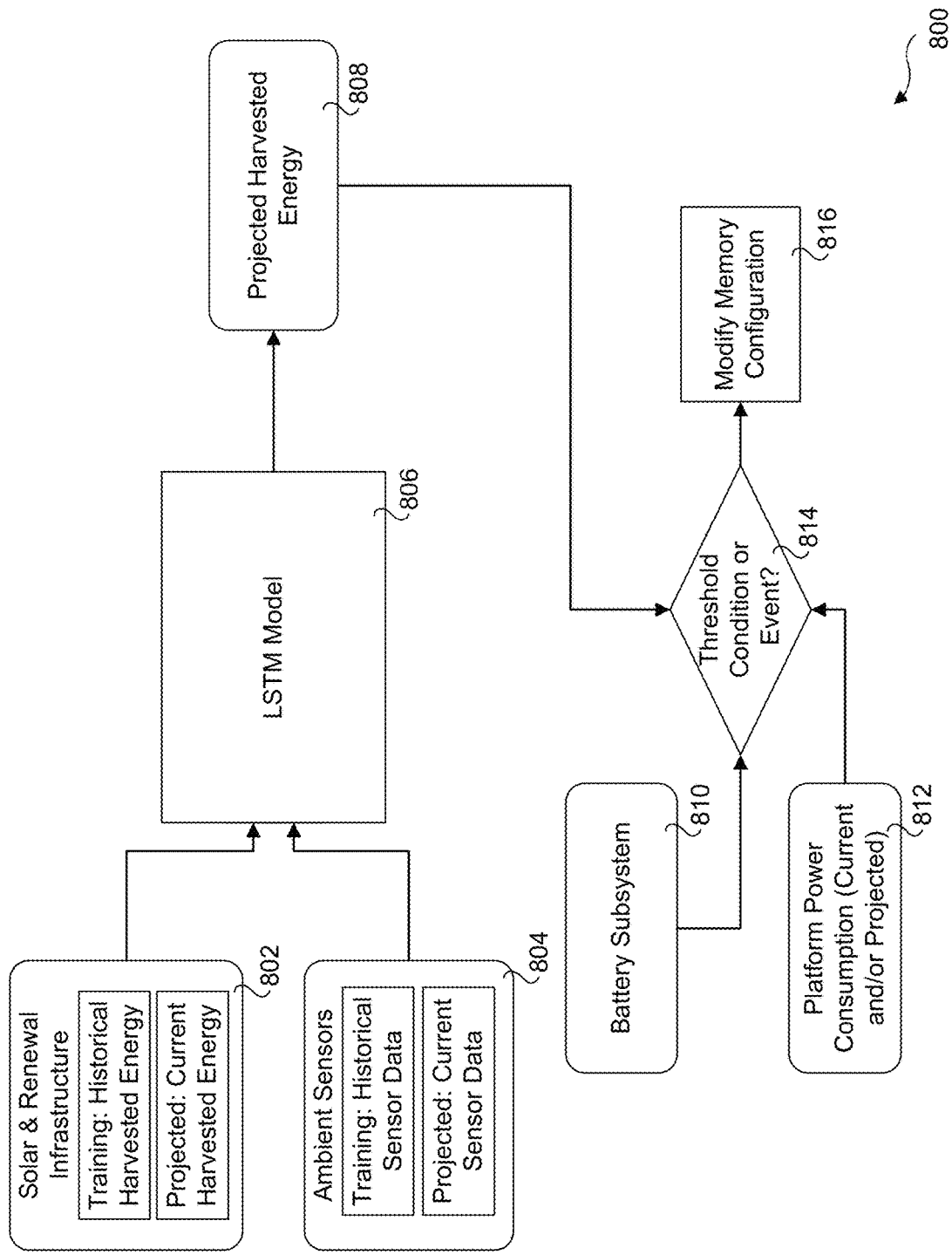
FIG. 8 is a process flow diagram illustrating use of an LSTM machine learning model for projecting energy harvested from a green energy source and illustrating detection of energy threshold conditions, according to one embodiment.

Another aspect of some embodiments is the use of machine learning and artificial intelligence for predicting harvested energy harvest levels and reconfiguring the platform in view of available and/or projected battery power, and current and/or projected platform workload. A process flow diagram 800 illustrating corresponding operations is shown in FIG. 8.

In one embodiment, a Long Short-Term Memory (LSTM) model 806 is used to predict harvested energy levels 808 throughout the day based on historical harvested energy data 802 for the green energy source and historical ambient sensor data 804. An LSTM is an artificial recurrent neural network (RNN) machine learning model that is trained on sequence of labeled input data input data and is used to predict an output (in this case predicted harvested energy 808). While LSTMs are often associated with speech recognition (natural language processing), they may also be used providing time-based predictions based on sequential time-based input data, where are used in the embodiments here. As an option, a machine learning model based on Gated Recurrent Units (GRUs) rather than LSTM cells may be used.

LSTM model 806 receives sequences of time-stamped historical harvested energy data and historical ambient sensor data as its inputs. The LSTM model employs a sequence of LSTM cells to "learn" input sequence patterns (through training), and the trained model outputs a predicted pattern of values. In one embodiment training and predicting is done concurrently, while noting the trained model is based on past input training data.

Figure 9A:
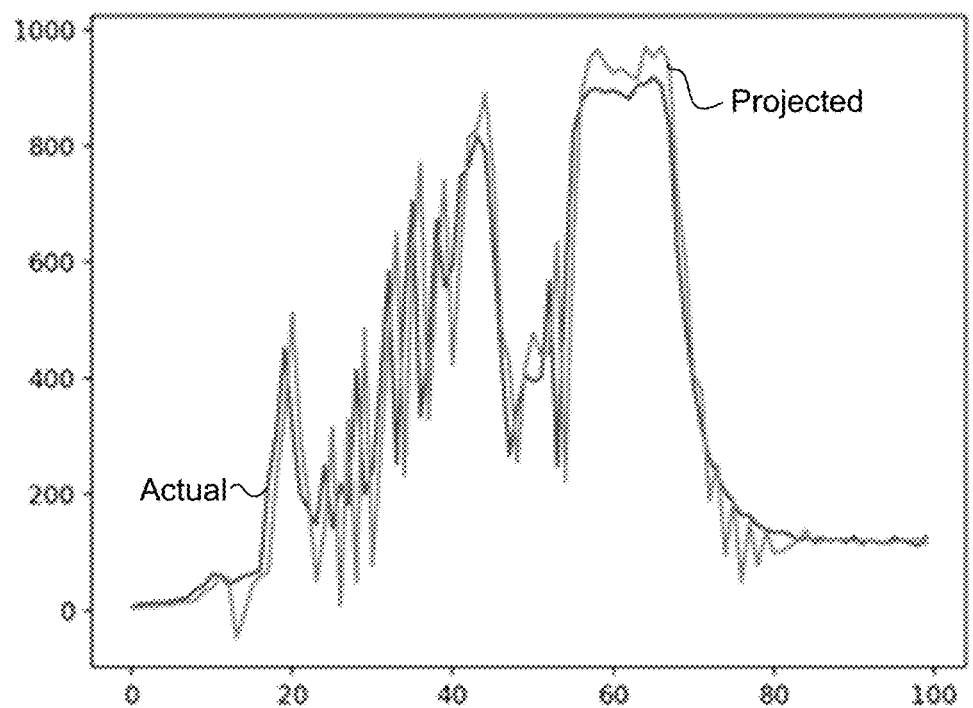
FIGS. 9a and 9b respectively show examples of LSTM model performance for one-month of training data and for three-months of training data.
Figure 9B:
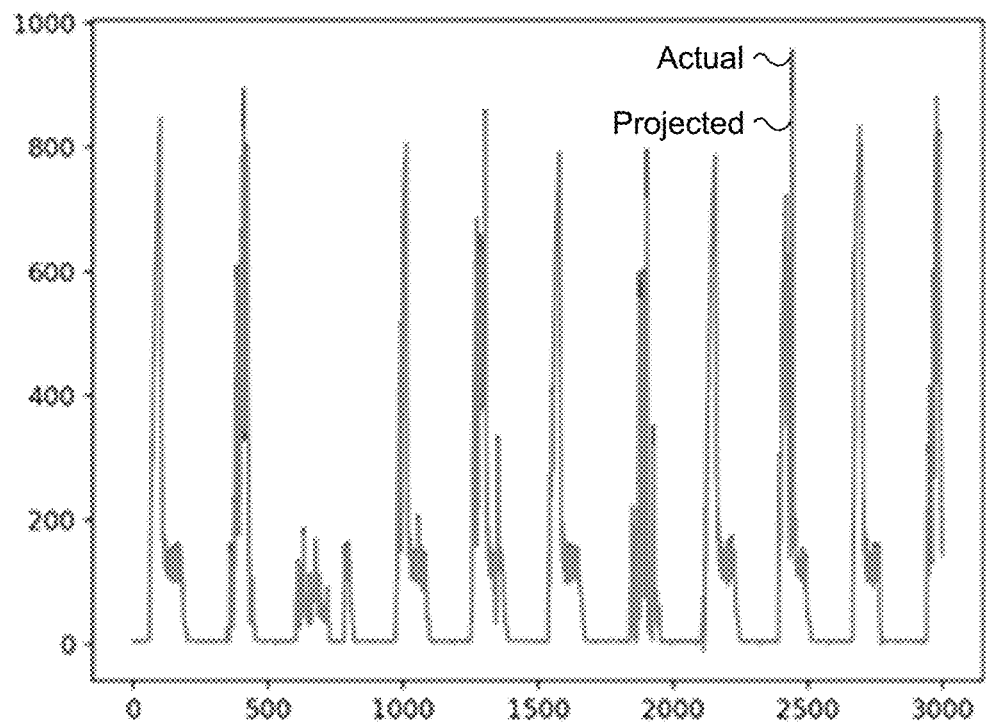

Examples of LSTM model performance are shown in FIG. 9a (for one-month of training data) and FIG. 9b (for three-months of training data), where the Y-axis data are normalized. As is readily apparent, the projected and actual energy harvesting values using one-month of training data is very good and is nearly a perfect match when using three-months of training data.

Returning to FIG. 8, an energy threshold condition or event decision block 814 receives inputs from predicted harvested energy 808, sensor data from battery subsystem 810, and platform power consumption data 812. Platform power consumption data may include current power consumption data using telemetry data obtained by power prediction and telemetry unit 518 and (optionally) historical power consumption data. In view of these inputs, a determination is made by threshold condition decision or event block 814 to whether a threshold condition for reconfiguring the platform memory is met.

As an option, memory configurations may be modified in response to events generated by an operator or the like, or event generated by software running on a platform. For example, an operator may observe a current or projected situation under which it may be desirable to modify the memory configuration to reduce power consumption. Such a situation might be a weather condition such as a thunderstorm, heavy rain, snow storm, etc.

Figure 10A:
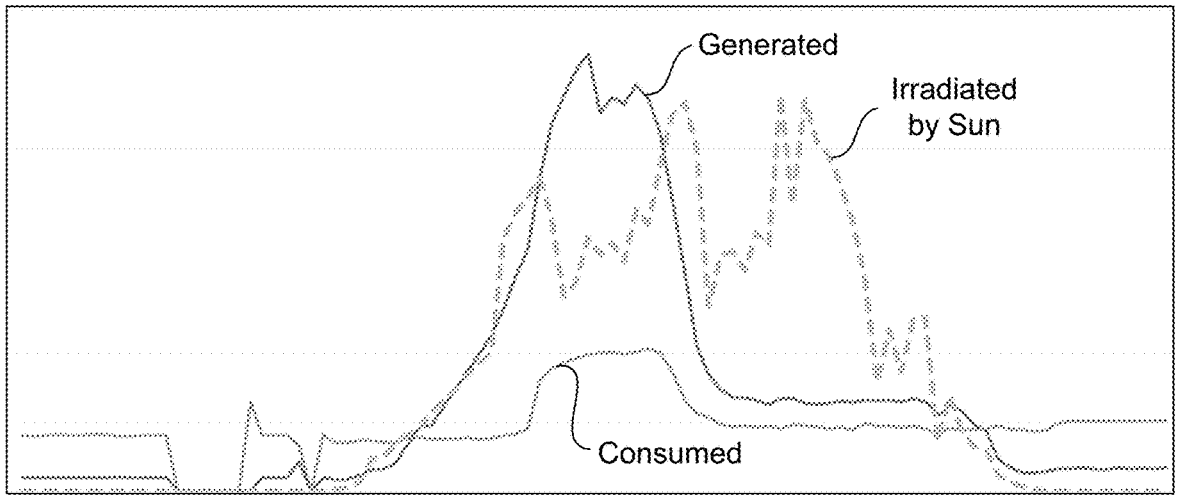
FIG. 10a is a graph illustrating energy generated by a solar system, energy irradiated from the sun, and energy consumed by a green edge appliance during a sunny day.
Figure 10B:
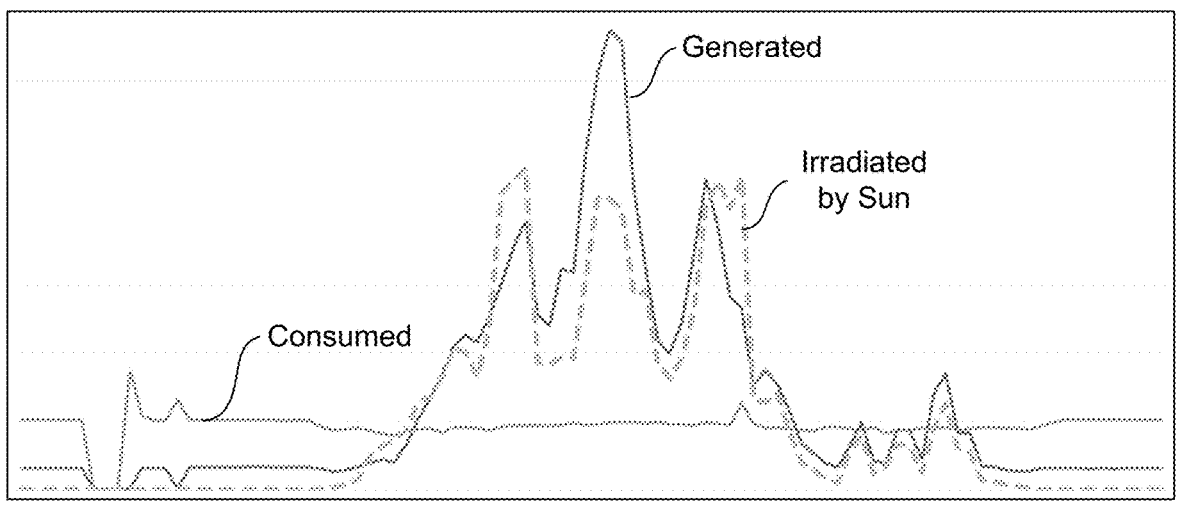
FIG. 10b is a graph illustrating energy generated by the solar system, energy irradiated from the sun, and energy consumed by the green edge appliance for a rainy day.

Generally, the platform power consumption levels will vary throughout the day based on a combination of demand and harvested power. Examples of this are illustrated in the graphs of FIGS. 10a and 10b which respectively depict data over a 24-hour period for a sunny day and a rainy day. In these examples, the green power energy source is solar. As shown in FIG. 10a, the level of power consumed may be increased when the generated power (i.e., the power harvested from the green energy source(s)) increases. In cases where the solar panel/array is fixed, the amount of generated power and the level of irradiated sunlight may differ since the angle of the sun relative to the solar panel/array will vary throughout the day.

In one embodiment, energy threshold conditions are determined as a factor of the current battery subsystem power level and the current platform power consumption level. In other embodiments, further input data are considered including 1) projected available power (as a function of projected energy harvesting) and/or 2) projected platform power consumption based on projected demand. Data shown in FIGS. 10a and 10b may be aggregated across weeks, months, and/or years to enhance projections. Humidity data and/or weather forecast data may also be used as input for projecting energy harvesting levels.

Figure 11:
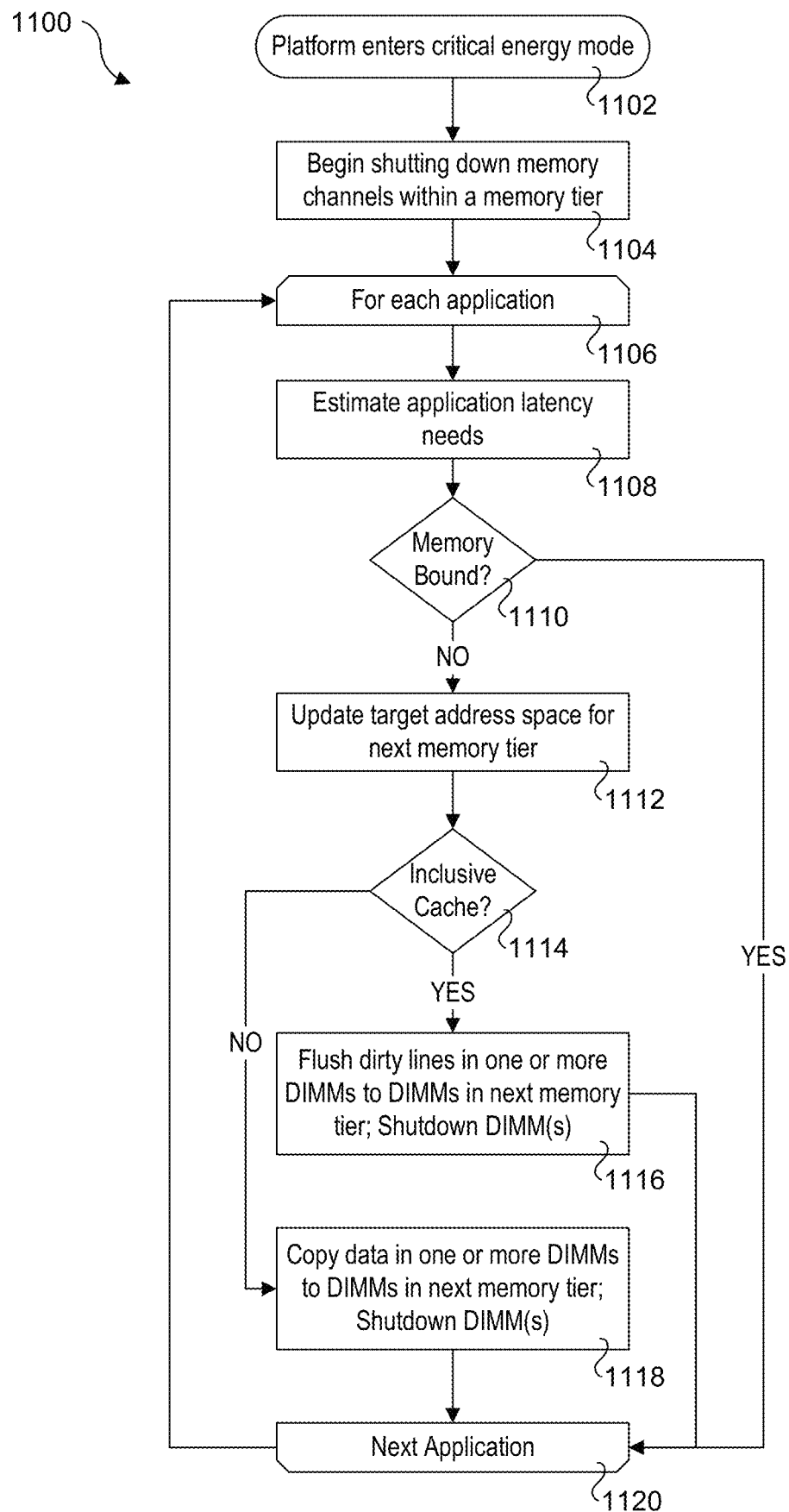
FIG. 11 is a flowchart illustrating operations and logic performed in response to entering a critical energy mode, according to one embodiment.

FIG. 11 shows a flowchart 1100 illustrating operations and logic performed in response to entering a critical energy mode, according to one embodiment. As shown in a start block 1102, the platform has entered a critical energy mode. This situation/condition may be identified using any of the techniques described and illustrated above. In a block 1104 memory channels within a memory tier begin to be shut down. This operation proceeds as follows.

As shown by start and end loop blocks 1106 and 1120, the operations of blocks 1108, 1112, 1114, 1116, 1118, and decisions block 1110 and 1114 are performed for each of multiple applications. Generally, the multiple applications may include pre-identified applications, such as instances of applications performing targeted functions, and/or may be determined dynamically.

In block 1108, an estimation is made for the latency needs of the application. In one embodiment this may be predetermined (e.g., a list of memory-bound applications may be provided) and/or determined by application monitoring unit 512. In decision block 1110 a determination is made to whether the application is memory-bound. Memory-bound applications are those applications for which latency requirements need to be met. If the application is determined to be memory-bound, the answer to decision block 1110 is YES and the logic proceeds to loop back to evaluate the next application.

If the application is determined to not be memory-bound, the answer to decision block 1110 is NO and the logic proceeds to block 1112 in which the target address space for a next memory tier is updated. This entails identifying which DIMMs in the current tier are storing data for the application and the address space(s) to store the application data in the next memory tier. In a decision block 1114 a determination is made to whether the memory tier includes DIMMs being used as inclusive caches. If so, the answer to decision block 1114 is YES and the logic proceeds to a block 1116 in which dirty lines are flushed from one or more DIMMs to DIMMs in the next memory tier and the one or more DIMMs are shutdown (e.g., deactivated or put in a low-power standby state). In instances where a DIMM is used as an inclusive cache and that DIMM does not include any dirty lines, there are no lines to flush and the DIMM is shutdown. The logic will then loop back to evaluate the next application.

If the tiered memory architecture employs a non-exclusive cache or does not employ a cache, the answer to decision block 1114 with be NO and the logic will proceed to block 1118 in which data are copied from one or more DIMMs to DIMMs in the next memory tier. Once copying is complete, the one or more DIMMs in the current memory tier are shutdown, and the logic loops back to evaluate the next application.

In addition to use in green energy edge appliances and systems, the teachings and principles disclosed herein may be more generally applied to any platform or system having any power source. Under these types of deployment, memory configuration changes may be effected by events or the like, including events that are generated by operators and/or software running on the platforms and systems.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', 'W', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic or a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a platform including one or more central processing units (CPUs) operatively coupled to a plurality of Dual Inline Memory Modules (DIMMs) comprising:
   employing multiple DIMMs to store data associated with software executing on the one or more CPUs, the data are stored in a plurality of memory tiers including a first tier and a second tier;
   copying data from one or more DIMMs in the first tier to one or more DIMMs in the second tier; and
   putting the one or more DIMMs in the first tier from which data were copied into a reduced power or deactivated state.

2. The method of claim 1, further comprising:
   flushing dirty lines in a DIMM in a first memory tier being used as a cache for a second memory tier and reducing a power state of or deactivating the DIMM in the first memory tier.

3. The method of claim 1, wherein the platform includes a Network Interface Controller (NIC) and the plurality of memory tiers include a virtual tier on the platform under which the physical memory associated with the virtual tier is located in a remote platform in communication with the platform, further comprising:
   copying data from one or more DIMMs in the second tier or a third tier to the virtual tier by employing Remote Direct Memory Access (RDMA) operations using the NIC to copy the data to the remote platform; and
   employing RDMA operations using the NIC to access data from the remote platform.

4. The method of claim 1, wherein the platform is powered by a battery subsystem receiving input energy harvested from one or more green energy sources, and the method for further comprises:
   detecting an energy threshold condition under which a current or a projected available battery power level from the battery subsystem in view of a current or projected platform power consumption level crosses a threshold; and,
   in response thereto,
      copy the data from the one or more DIMMs in the first tier to the one or more DIMMs in the second tier; and
      put the one or more DIMMs in the first tier from which data were copied into the reduced power or deactivated state.

5. The method of claim 4, further comprising:
   implementing a machine learning model to project an amount of harvested energy from the one or more green energy sources to be received by the battery subsystem;
   detecting a current power level in the battery subsystem;
   determining at least one of a current platform power consumption level and a projected platform power consumption level; and
   detecting the energy threshold condition as a function of the projected amount of harvested energy to be received by the battery subsystem, the current power level in the battery subsystem, and the at least one of the current platform power consumption level and the projected platform power consumption level.

6. The method of claim 5, wherein the machine learning model is one of a Long Short-Term Memory (LSTM) model and a machine learning model employing a plurality of Gated Recurrent Units (GRUs), further comprising:
   training the machine learning model with time-based historical harvested energy data and time-based historical ambient sensor data;
   employing a trained machine learning model to project a harvested energy level using input data comprising at least one of a current harvested energy level, current ambient sensor data, and forecast weather data.

7. The method of claim 1, further comprising:
   for one or more software applications executing on a CPU,
      identifying one or more DIMMs storing data for the application;
      determining latency requirements for the application; and
      in view of the latency requirements and the one or more DIMMs that are identified, determining whether data should be copied from at least one of the one or more DIMMs.

8. The method of claim 1, further comprising:
   implementing platform address decoders to map virtual memory addresses to physical addresses on the plurality of DIMMs; and
   in response to copying data from a first DIMM to a second DIMM, reprogramming at least one platform address decoder to map virtual addresses for the copied data to new physical memory addresses on the second DIMM.

9. The method of claim 1, further comprising:
   detecting an event invoked or enunciated by an operator of the platform or software running on the platform; and
   in response thereto,
      copy the data from the one or more DIMMs in the first tier to the one or more DIMMs in the second tier; and
      put the one or more DIMMs in the first tier from which data were copied into the reduced power or deactivated state.

10. A platform, comprising:
    one or more central processing units (CPUs);
    a plurality of Dual Inline Memory Modules (DIMMs), operatively coupled to the one or more CPUs, wherein the plurality of DIMMS is implemented in a plurality of memory tiers including a first tier and a second tier;
    at least one of embedded logic and embedded hardware configured to,
       copy data from one or more DIMMs in the first tier to one or more DIMMs in the second tier; and
       put the one or more DIMMs in the first tier from which data were copied into a reduced power or deactivated state,
    wherein the at least one of embedded logic and embedded hardware includes one or more embedded processing elements and at least one of software and firmware instructions configured to be executed on the one or more embedded processing elements.

11. The platform of claim 10, further comprising at least one of embedded logic and embedded hardware to:
    flush dirty lines in a DIMM in a first memory tier being used as a cache for a second memory tier and reduce a power state of or deactivate the DIMM in the first memory tier.

12. The platform of claim 2, wherein the platform further includes a Network Interface Controller (NIC) operatively coupled to a CPU and the plurality of memory tiers include a virtual tier on the platform under which the physical memory associated with the virtual tier is located in a remote platform in communication with the platform, further comprising at least one of embedded logic and embedded hardware to:
copy data from one or more DIMMs in the second tier or a third tier to the virtual tier by employing Remote Direct Memory Access (RDMA) operations using the NIC to copy the data to the remote platform; and
employ RDMA operations using the NIC to access data from the remote platform.

13. The platform of claim 10, wherein the platform is powered by a battery subsystem receiving input energy harvested from one or more green energy sources, further comprising at least one of embedded logic and embedded hardware to:
detect an energy threshold condition under which a current or a projected available battery power level from the battery subsystem in view of a current or projected platform power consumption level crosses a threshold; and,
in response thereto,
copy the data from the one or more DIMMs in the first tier to the one or more DIMMs in the second tier; and
put the one or more DIMMs in the first tier from which data were copied into the reduced power or deactivated state.

14. The platform of claim 13, further comprising at least one of embedded logic and embedded hardware to:
implement a machine learning model to project an amount of harvested energy from the green energy source to be received by the battery subsystem;
detect a current power level in the battery subsystem;
determine at least one of a current platform power consumption level and a projected platform power consumption level; and
detect the energy threshold condition as a function of the projected amount of harvested energy to be received by the battery subsystem, the current power level in the battery subsystem, and the at least one of the current platform power consumption level and the projected platform power consumption level.

15. The platform of claim 14, wherein the machine learning model is one of a Long Short-Term Memory (LSTM) model and a machine learning model employing a plurality of Gated Recurrent Units (GRUs) that is trained with historical harvested energy data and historical ambient sensor data, and the compute platform is configured to employ the machine learning model to project a harvested energy level using input data comprising at least one of a current harvested energy level and current ambient sensor data.

16. The platform of claim 10, wherein the platform is configured to execute software applications on the one or more CPUs, further comprising at least one of embedded logic and embedded hardware to:
for one or more software applications executing on a CPU,
identify one or more DIMMs storing data for the application;
determine latency requirements for the application; and
in view of the latency requirements and the one or more DIMMs that are identified, determine whether data should be copied from at least one of the one or more DIMMs.

17. The platform of claim 10, further comprising at least one of embedded logic and embedded hardware to:
detect an event invoked or enunciated by an operator of the platform or software running on the platform; and
in response thereto,
copy the data from the one or more DIMMs in the first tier to the one or more DIMMs in the second tier; and
put the one or more DIMMs in the first tier from which data were copied into the reduced power or deactivated state.

18. A green edge appliance comprising:
one or more solar panels;
a battery subsystem to receive energy harvested by the one or more solar panels; and
a first platform configured to be powered by the battery subsystem and comprising:
one or more central processing units (CPUs);
a plurality of Dual Inline Memory Modules (DIMMs), operatively coupled to the one or more CPUs, wherein the plurality of DIMMS is implemented in a plurality of memory tiers including a first tier and a second tier; and
at least one of embedded logic and embedded hardware configured to:
detect an energy threshold condition under which a current or a projected available battery power level crosses a threshold; and
in response thereto,
copy data from one or more DIMMs in the first tier to one or more DIMMs in the second tier; and
put the one or more DIMMs in the first tier from which data were copied into a reduced power or deactivated state;
wherein the at least one of embedded logic and embedded hardware includes one or more embedded processing elements and at least one of software and firmware instructions configured to be executed on the one or more embedded processing elements.

19. The green energy edge appliance of claim 18, further comprising a plurality of platforms having a configuration similar to the first platform.

20. The green energy edge appliance of claim 18, further comprising:
a storage class memory (SCM) node comprising a plurality of DIMMs coupled to the first platform via a fabric, wherein the plurality of DIMMs are implemented as a second or third memory tier.

21. The green energy edge appliance of claim 18, wherein the first platform further comprises at least one of embedded logic and embedded hardware to:
implement a machine learning model to project an amount of harvested energy from the one or more solar panels to be received by the battery subsystem;
detect a current power level in the battery subsystem;
determine at least one of a current platform power consumption level and a projected platform power consumption level; and
detect the energy threshold condition as a function of the projected amount of harvested energy to be received by the battery subsystem, the current power level in the battery subsystem, and the at least one of the current platform power consumption level and the projected platform power consumption level.

22. The green energy edge appliance of claim 18, wherein the first platform is configured to execute software applications on the one or more CPUs, further comprising at least one of embedded logic and embedded hardware to:
for one or more software applications executing on a CPU, identify one or more DIMMs storing data for the application;

determine latency requirements for the application; and in view of the latency requirements and the one or more DIMMs that are identified, determine whether data should be copied from at least one of the one or more DIMMs.

23. The green energy edge appliance of claim 18, wherein the first platform further includes a Network Interface Controller (NIC) operatively coupled to a CPU and DIMMs from the plurality of DIMMs are implemented in a plurality of memory tiers including at least a first and second tier and a virtual tier under which the physical memory associated with the virtual tier is located in a remote platform in communication with the first platform, further comprising at least one of embedded logic and embedded hardware to:

copy data from one or more DIMMs in the second tier or a third tier to the virtual tier by employing Remote Direct Memory Access (RDMA) operations using the NIC to copy the data to the remote platform; and employ RDMA operations using the NIC to access data from the remote platform.

\* \* \* \* \*